US010755119B2

(12) United States Patent
Dolgov et al.

(10) Patent No.: US 10,755,119 B2
(45) Date of Patent: Aug. 25, 2020

(54) PLAUSIBILITY CHECK OF THE OBJECT RECOGNITION FOR DRIVER ASSISTANCE SYSTEMS

(71) Applicant: Robert Bosch GmbH, Stuttgart (DE)

(72) Inventors: Maxim Dolgov, Renningen (DE); Thomas Michalke, Weil der Stadt (DE); Florian Wildschuette, Hildesheim (DE); Hendrik Fuchs, Hildesheim (DE); Ignacio Llatser Marti, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 16/110,134

(22) Filed: Aug. 23, 2018

(65) Prior Publication Data

US 2019/0073545 A1 Mar. 7, 2019

(30) Foreign Application Priority Data

Sep. 5, 2017 (DE) .................. 10 2017 215 552

(51) Int. Cl.
*G06K 9/00* (2006.01)
*G06K 9/62* (2006.01)
(Continued)

(52) U.S. Cl.
CPC .......... *G06K 9/00818* (2013.01); *B60Q 9/00* (2013.01); *B60W 50/14* (2013.01);
(Continued)

(58) Field of Classification Search
CPC ...... G06K 9/00818; G06K 9/627; G06K 9/66; G06K 9/00825; G06K 9/00805;
(Continued)

(56) References Cited

U.S. PATENT DOCUMENTS 9,459,113 B2 10/2016 Zhang et al.
10,332,320 B2* 6/2019 Lakshamanan ... B60W 50/0098
(Continued)

FOREIGN PATENT DOCUMENTS

EP 2 133 253 * 12/2009
EP 2 390 862 * 11/2011
(Continued)

OTHER PUBLICATIONS

Machine translation for EP 2 133 253 (Year: 2009).*
(Continued)

*Primary Examiner* — Qian Yang
(74) *Attorney, Agent, or Firm* — Norton Rose Fulbright US LLP; Gerard Messina

(57) ABSTRACT

A plausibility check module for a vehicle driver assistance system, including at least one sensor for detecting the vehicle surroundings, and Kl-module(s) to classify objects in the surroundings based on the sensor data supplied by the sensor with an internal processing chain established by parameters, the plausibility check module receiving pieces of reference information about objects in the surroundings supplied by other vehicles and/or by an infrastructure, and comparing the pieces of reference information with the classification result by the Kl-module and to initiate at least one measure for a deviation established by the comparison, so that the parameters of the processing chain of the Kl-module are adapted to the effect that the deviation is reduced in comparable situations. Also described are a driver assistance system having the plausibility check module and Kl-module(s), a method for calibrating a sensor for detecting the vehicle surroundings, and an associated computer program.

7 Claims, 3 Drawing Sheets

(51) Int. Cl.
*B60Q 9/00* (2006.01)
*B60W 50/14* (2020.01)
*G06K 9/66* (2006.01)

(52) U.S. Cl.
CPC ..... *G06K 9/00805* (2013.01); *G06K 9/00825* (2013.01); *G06K 9/627* (2013.01); *G06K 9/66* (2013.01); *B60W 2050/143* (2013.01); *B60W 2050/146* (2013.01); *G06K 9/00798* (2013.01)

(58) Field of Classification Search
CPC .............. G06K 9/00798; B60W 50/14; B60W 2050/146; B60W 2050/143; B60W 2050/0088; B60W 40/04; B60W 40/00; B60Q 9/00
See application file for complete search history.

(56) References Cited

U.S. PATENT DOCUMENTS

| | | |
|---|---|---|
| 2009/0005929 A1 | 1/2009 | Nakao et al. |
| 2010/0211270 A1* | 8/2010 | Chin ............ B62D 6/007 701/44 |
| 2015/0161456 A1 | 6/2015 | Chevalley |
| 2016/0223643 A1 | 8/2016 | Li et al. |
| 2017/0113664 A1* | 4/2017 | Nix ............ B60T 8/17558 |

FOREIGN PATENT DOCUMENTS

| | | |
|---|---|---|
| GB | 2 484 795 A | 4/2012 |
| KR | 20130113102 A | 10/2013 |

OTHER PUBLICATIONS

Machine translation for EP 2 390 862 (Year: 2011).*
Ma et al., "Real-Time Highway Traffic Condition Assessment Framework Using Vehicle-Infrastructure Integration (VII) With Artificial Intelligence (AI)", IEEE Transactions on Intelligent Transportation Systems, vol. 10, No. 4, Dec. 2009 (Year: 2009).*

* cited by examiner

PLAUSIBILITY CHECK OF THE OBJECT RECOGNITION FOR DRIVER ASSISTANCE SYSTEMS

RELATED APPLICATION INFORMATION

The present application claims priority to and the benefit of German patent application no. 10 2017 215 552.3, which was filed in Germany on Sep. 5, 2017, the disclosure which is incorporated herein by reference.

FIELD OF THE INVENTION

The present invention relates to an improvement in the recognition of objects with the aid of sensors in driver assistance systems, which are usable for assisting a human driver as well as for at least partially automated driving.

BACKGROUND INFORMATION

In order to guide a vehicle in road traffic, it is essential to react to objects in the surroundings of the vehicle, such as obstacles, other vehicles, roadway markings or traffic signs. The reliable recognition of objects from sensor data supplied by sensors is therefore a very important part of many driver assistance systems for assisting a human driver and a core aspect of at least partially automated driving.

Patent document GB 2 484 795 A discusses a method for operating a sensor, in which the position of a recognized object is ascertained on the one hand based on the sensor data supplied by the sensor and on the other hand based on a message sent by the object itself. The sensor is automatically calibrated based on the comparison of the two positions.

Patent document U.S. Pat. No. 9,459,113 discusses a navigation system, which outputs instructions for turning with the aid of an arrow to the driver. In order for the arrow to be at the right location, a camera included in the system is calibrated based on the objects recognized in the surroundings.

Patent document US 2016/223 643 A1 discusses a radar system for recognizing objects which, in addition to its own radar signals, also utilizes the radar signals emitted from other vehicles.

Patent document US 2009/005 929 A1 discusses a system that evaluates pieces of information about the driving behavior of a vehicle, in order to assist in localizing the vehicle on a map.

Additional general related art for calibrating sensors is specified in US 2015/161 456 A1 and in KR 2013 113 102 A.

SUMMARY OF THE INVENTION

Within the scope of the present invention, a plausibility check module for a driver assistance system for a vehicle has been developed. The driver assistance system includes at least one sensor for detecting the surroundings of the vehicle as well as at least one Kl-module. It may, for example, be a system for assisting a human driver or else, for example, a system for at least partially automated driving.

The Kl-module is configured to classify objects in the surroundings of the vehicle based on the sensor data supplied by the sensor with the aid of an internal processing chain established by parameters.

The objects may, for example, be traffic signs, roadway markings or other vehicles.

The Kl-module may, for example, include an artificial neuronal network, such as, for example, a "convolutional neural network," CNN, as an internal processing chain. The Kl-module may, for example, also be based on machine learning according to the Viola-Jones method.

The parameters of the internal processing chain may, for example, in the case of an artificial neuronal network, include weights or probabilities with which connections between various layers of the network are verified.

The plausibility check module is configured to receive pieces of reference information about objects in the surroundings of the vehicle supplied by other vehicles and/or by an infrastructure.

Other vehicles, for example, which are equipped for interlinked driving, may transmit their position to further vehicles in the surroundings ("Vehicle-to-Vehicle" communication, V2V) or also to an infrastructure ("Vehicle-to-Infrastructure" communication, V2I). The infrastructure may forward such pieces of reference information and additionally, for example, augment them with pieces of information about traffic signs or roadway markings. Thus, the plausibility check module is advantageously connectable to a radio interface, which is able to acquire the cited pieces of reference information ("Vehicle-to-X, V2X). If the pieces of reference information relate to a vehicle, for example, they may also contain, in addition to the position, also the exact vehicle type, the dimensions of the vehicle and/or a piece of information about attached accessories.

The plausibility check module is configured to compare the pieces of reference information with the result of the classification by the Kl-module.

In this comparison, it may be checked, in particular, whether each object which, according to the pieces of reference information, is present in the surroundings of the vehicle, has even been recognized as present by the Kl-module. Subsequently, it may be checked whether the object has been correctly classified, i.e., for example, as the vehicle type corresponding to the pieces of reference information or as the vehicle model corresponding to the pieces of reference information.

The plausibility check module is configured to initiate at least one measure in the case of a deviation established by the comparison, so that the parameters of the processing chain of the Kl module are adapted to the effect that the deviation is reduced in comparable situations.

It has been found that the dependability and operational safety of the driver assistance system may be ensured even if the traffic landscape is enhanced at the point in time the system is manufactured by unknown objects.

Thus, for example, new vehicle models are continually introduced on the market, which sometimes strongly differ visually from previously known models specifically in order to a create a unique stand-alone feature. The case may then occur in which the vehicle is no longer even recognized by the Kl-module as a vehicle or is even completely missing from the set of objects recognized by the Kl-module.

In addition, the legislative organ continually creates new traffic signs or modifies existing signs. Thus, for example, a new uniform traffic sign was introduced in 2009 for marking railroad crossings in place of the traffic signs "gated railroad crossing" and "ungated railroad crossing."

According to the previous related art, the user of the vehicle was reliant on the manufacturer of driver assistance systems in such situations, so that the system is able to recognize these definitely safety-relevant objects and to respond accordingly. Initially, therefore, it was the responsibility of the manufacturer to promptly update corresponding changes and subsequently, it was the responsibility of the user to input these changes. The plethora, in particular, of new vehicle types, however, makes it difficult to impossible to continually keep a Kl-module updated in this regard from one central point. Continually occurring massive waves of attack in the area of IT security based on known security holes also show that not nearly all updates provided by manufacturers end up on all systems. Users frequently fail to meet their obligation in this regard.

In contrast, the plausibility check module makes it possible to automate and to decentralize the updating of the Kl-module. This may prevent, for example, the updating from being completely missed. This in turn has a positive impact on the approvability of the driver assistance system. In the case of an updating that is in the hands of the driver, the authorities will possibly impose constraints for the case in which the updating is not carried out. For example, the driver assistance system may be mandatorily deactivated after a waiting period.

The plausibility check module may be contained in the Kl-module, but it may also be a separate module. The latter is particularly advantageous for retrofitting. If the Kl-module is self-learning, for example, then it has potentially made further learning progress, which is stored in the parameters of its internal processing chain, since it was delivered to the user. These parameters cannot be readily ported to a Kl-module of another type; the change of the Kl-module may therefore mean that learning progress is lost.

In one particularly advantageous embodiment of the present invention, the measure taken by the plausibility check module is at least that the Kl-module is to be set into a learning mode and the sensor data are to be supplied to the Kl-module as a learning-value for its input variable and the pieces of reference information as a learning-value for its output variable. The KI-module may then be trained to correctly recognize in the future the object in the presence of identical or essentially similar sensor data.

The training of the Kl-module is a computing-intensive task, which is potentially protracted by the computing capacity available onboard a vehicle. In addition, the Kl-module in the delivery condition potentially includes only the parameters of the processing chain programmed ex-factory, but not the learning-data from which these parameters are obtained. Thus, for example, a Kl-module is typically trained with several tens of thousands of images for recognizing objects in images, for which there is potentially insufficient memory space available onboard a vehicle.

Thus, in another particularly advantageous embodiment of the present invention, the measure is at least to report the sensor data and the pieces of reference information to an external server, which is configured to use this report as learning information for the calculation of updated parameters for the processing chain of the Kl-module.

This offers the further advantage that the information about new objects may be aggregated by numerous vehicles. Combinations and mixed forms are also possible. Initially, for example, a self-sufficient learning process of the Kl-module may be initiated, in order, as much as possible, to retrofit a recognition of the new object with an on-board arrangement. This recognition may later be refined on the basis of parameters obtained in a more comprehensive learning process on the external server.

In addition, training data for retraining the Kl-module may be very quickly obtained in this way, so that a software update for the Kl-module may be offered much more quickly than when utilizing classical approaches for generating training data. According to the previous related art, engineers must test whether the Kl-module has difficulties in recognizing new vehicle types or other new types of objects. If this is the case, the necessary "ground truth" must be generated by manually labelling images. Only then may the Kl-module be retrained and a corresponding software update be distributed. This takes a significantly longer period of time, which in turn means that a new vehicle model or another new type of object is far from being recognized by the Kl-module.

A learning process of the Kl-module, whether carried out internally or externally, may take some time, in which the recognition of the new object by the Kl-module is not yet guaranteed. The plausibility check module is also advantageously configured to actuate an acoustic and/or a visual warning device of the vehicle in the case of a deviation established by the comparison, in order to make the driver of the vehicle aware of the deviation. The driver may then respond to this, for example, by attentively monitoring the surroundings him or herself and by preparing to intervene him or herself in the event of a malfunction of the driver assistance system.

Within the scope of the present invention, a driver assistance system for a vehicle has also been developed. This driver assistance system includes at least one sensor for detecting the surroundings of the vehicle, as well as at least one Kl-module. The Kl-module is configured to classify objects in the surroundings of the vehicle based on the sensor data supplied by the sensor with the aid of an internal processing chain established by parameters.

The term driver assistance system in this case includes both a system, which is used merely to assist a human driver, as well as a system, which is used for at least partially automated driving.

At least two Kl-modules are provided. In this case, the parameters of the processing chain of the first Kl-module are invariable, whereas the parameters of the processing chain of the second Kl-module are variable as a result of the measures initiated by the plausibility check module.

The system requires official approval at the latest when the driver assistance system not only informs the driver, but intervenes in the control of the vehicle. In the case of a change of parameters of the processing chain in conjunction with a learning process for recognizing new objects, it is then not necessarily probable, but in principle, possible, depending on the type of the Kl-module used, that the recognition of other objects is diminished. Evidence of this not happening is potentially difficult to provide. The allocation of the object detection to two Kl-modules allows for a clean separation between the officially accepted object recognition on the one hand and a merely additional improving newly trained object recognition on the other hand.

For this purpose, the driver assistance system in another particularly advantageous embodiment of the present invention is configured to assess the union of the objects classified by the two Kl-modules as the set of objects present in the surroundings of the vehicle. Thus, one object may be added to the set of objects present in the surroundings of the vehicle if it has been coincidently recognized by the two Kl-modules, or else if it has been recognized by only one Kl-module. Discrepancies between the two Kl-modules may be resolved, for example, by the weighted combination of the confidence values ascertained by the two Kl-modules for the classification. If, for example, the first Kl-module is not quite certain (i.e. the confidence value ascertained by the first Kl-module is not high, but also not very low), whereas at the same time the second Kl-module is very certain (i.e., the confidence value ascertained by the second Kl-module is high), then the classification ascertained by the second KI-module may be significantly overweighted. The ultimate decision may be made, for example, by comparison with a threshold value. Discrepancies between the two KI-modules may be resolved alternatively or in combination but also, for example, to the effect that in the case of a discrepancy, the first KI-module has priority. For example, a regulatory requirement may exist to the effect that the first officially certified KI-module must override the second subsequently trained KI-module.

In another particularly advantageous embodiment of the present invention, the second KI-module is dispensable. In return, the at least one KI-module is configured to classify the objects according to a k-nearest neighbor method.

In such a method each learning data set or a preprocessed form thereof in the multidimensional space of the input variables of the KI-module is represented by a point, and this point is assigned the associated learning value of the output variable. For example, an image may be reduced to a few relevant features via an upstream neuronal network (convolutional neural network, CNN) which is not directly used for the recognition and classification of objects. This representation may then be interpreted as a reference point for the k-nearest neighbor method.

If during ongoing operation a data set of sensor data is then to be classified, then it is determined with a distance measure specific for the respective application which k corresponding to points associated with the learning data sets is closest to the point that corresponds to the instantaneous data set of sensor data. The classification, which is assigned to the majority of these points, is also assigned to the point that corresponds to the instantaneous data set. A self-learning effect may then be effectuated by permanently noting the new point in the aforementioned multidimensional space and the new point also being incorporated into the adjustment during the classification of additional data sets.

It has been found that this principle enables an incremental additional learning of the recognition of new objects, without the recognition of objects already known by the system being diminished. Particularly when an object is not recognized, this is synonymous with the fact that the point associated with the relevant sensor data is far away from the points that are relevant for the recognition of the objects already known by the system. Accordingly, a point added for the new object will not be one of the k-nearest, if a further set of sensor data is to be classified in terms of whether it is this object or that object already known. Thus, the approval-relevant evidence that the officially accepted object recognition is maintained in its entirety, even during additional learning, may be provided in an insightful manner.

The dependability of the object recognition and the learning progress during additional learning of new objects are a function of the quality of the sensor data supplied by the sensor. Only pieces of information that are present in these sensor data may be further evaluated. For this purpose, a correct calibration of the sensor may be important.

Thus, the present invention also relates to a method for calibrating a sensor for detecting the surroundings of a vehicle. In this method, at least one object in the surroundings of the vehicle is initially classified based on the sensor data supplied by the sensor. Subsequently, pieces of reference information regarding at least one feature of the classified object, which is nominally reflected in the sensor data, is retrieved from a database, which may be stored locally in the vehicle or else also in a cloud, for example. Finally, at least one manipulated variable of the sensor and/or a downstream data processing is optimized to the effect that the characteristic of the feature in the sensor data and/or in the result of the classification is correlated with the pieces of reference information.

If the sensor is a camera, for example, the feature may then be a visual feature specific to the respective object. If, for example, the object is a different vehicle, the distance between the taillights, distances between the corner points of the rear window or other characteristic dimensions, for example, may be used as visual features. Examples of intrinsic manipulated variables of a camera used as a sensor are the focal length, distortion parameter of the lens as well as lighting parameters. Examples of extrinsic manipulated variables are an installation angle and a panning angle of the camera in the vehicle.

If the sensor is a radar system, for example, then the appropriate measuring model may be used to calculate to which radar reflections, as evidenced by the pieces of reference information, an object, which is situated at a particular location in the space in a particular pose, should lead. If the radar reflections actually obtained deviate from the expected pattern over a longer period of time, then it may be concluded that the measuring model is inexact. The measuring model may be adapted to the effect that the deviation is reduced.

It has been found that this type of calibration may utilize the same assemblies and the same signal paths as the plausibility check module. The same pieces of reference information, in particular, may be used.

In one particularly advantageous embodiment of the present invention, a different vehicle is selected as a classified object. The pieces of reference information are retrieved based on a vehicle type, which is conveyed by the different vehicle and/or by the infrastructure via a wireless interface. Thus, the same "ground truth" obtainable via V2X communication may be used, which is also used for the plausibility check of the object recognition and for the subsequent additional learning of new objects. The receiving part of the wireless interface may be situated, for example, in the plausibility check module, but also at another location in the driver assistance system.

The pieces of reference information may, for example, be imbedded in a "cooperative awareness message," CAM, transmitted via V2X, which presently contains position data and velocity data. An extended CAM may contain, for example, the vehicle type, including body color, the geometry and load, potentially added accessories (such as a trailer or a bicycle rack on the rear end) or also a confidence about the position data, pose data and velocity data (for example, in the form of a covariance). These pieces of information may be imbedded, for example, in the "low frequency" container of the CAM. In this way, the vehicles are able to exchange information even among one another about the objects recognized by each respectively and about the respective positions, which further enhances the database.

Vehicles may also behave cooperatively and support a clear association of V2X data to detected vehicles. For this purpose, they may, for example, change the intensity of their taillight or carry out a modulation of the taillight invisible to the human driver using a particular code, which may be negotiated via V2X. This cooperative approach may be implemented initially within the fleet of a single manufacturer and ensures a perceptible benefit for the customer of this manufacturer by the increase in quality of the sensor data and by the accompanying improvement in the perception of the environment by the vehicle. Furthermore, vehicles may communicate their future planned routes and velocities in the form of trajectories. Thus, the clear assignment of a V2X transmitter to an object measured using an on-board sensor system then becomes possible, since the trajectory planned and transmitted via V2X may be compared ex-post with the actually driven trajectory of a measured vehicle. If a small deviation exists, then the assignment has taken place.

The plausibility check module and the driver assistance system, as well as the method, may be implemented, in particular, entirely or partially in software. This software is an independently sellable product, which is sellable, in particular, as an update or upgrade to existing modules, driver assistance systems or systems that include sensors. Thus, the present invention also relates to a computer program that includes machine-readable instructions which, when they are executed on a computer and/or in a control unit, upgrade a computer and/or the control unit to a plausibility check module provided by the present invention, and/or to a driver assistance system provided by the present invention, and/or prompt a method provided by the present invention to be carried out. The present invention also relates to a machine-readable data medium or to a download product that includes the computer program.

Additional measures that improve the present invention are described in greater detail below together with the description of the exemplary embodiments of the present invention with reference to figures.

DETAILED DESCRIPTION

Figure 1:
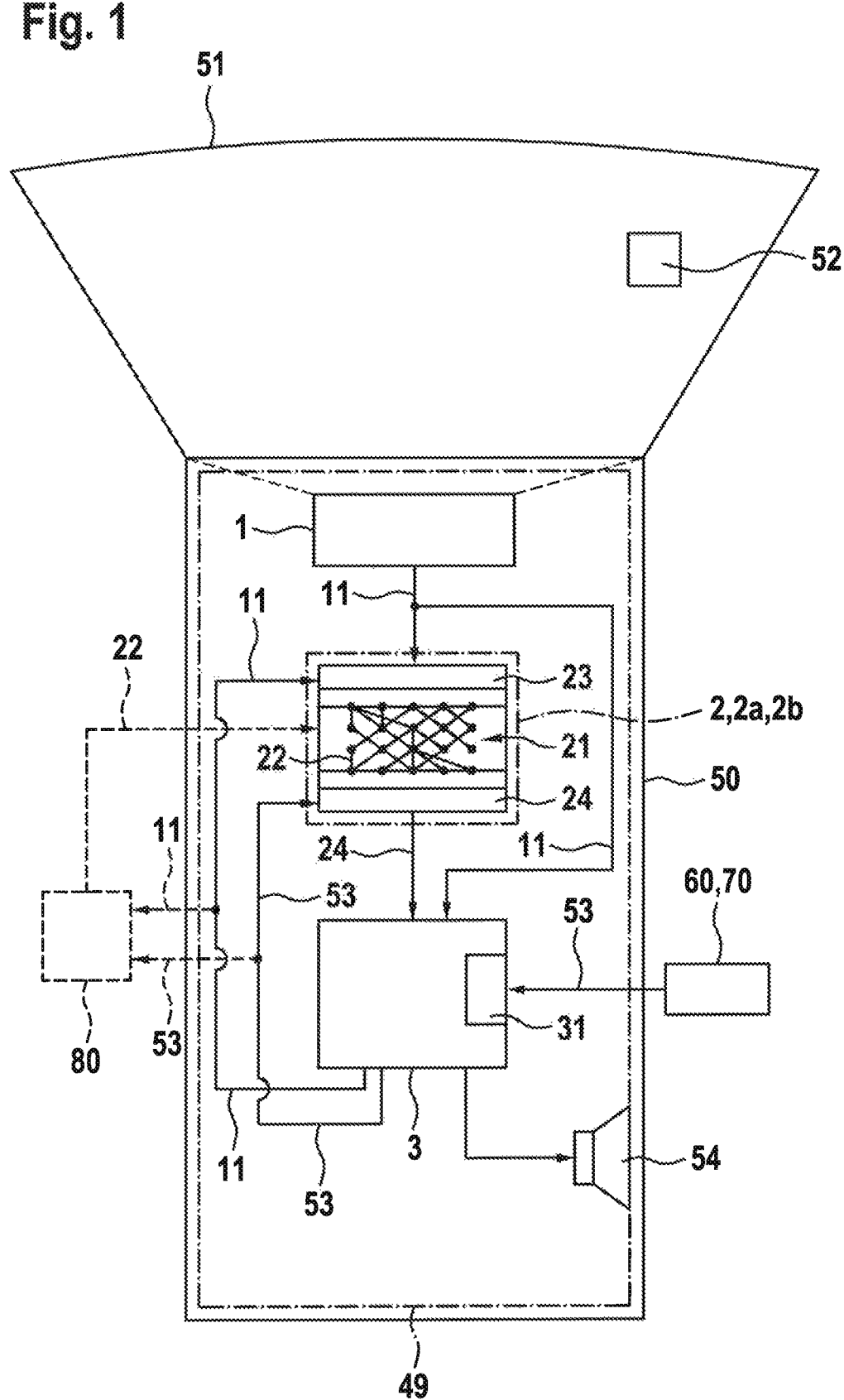
FIG. 1 shows an exemplary function of a plausibility check module 3 in a driver assistance system 49 for a vehicle 50.

According to FIG. 1, driver assistance system 49 includes a sensor 1, which monitors surroundings 51 of vehicle 50 and in the process, detects among other things object 52 plotted by way of example in FIG. 1. Sensor data 11 are passed on to KI-module 2, 2a, 2b and migrate through processing chain 21 starting from the input layer, in which they form input variable 23, in order finally to be processed in the output layer to the result of the classification as output variable 24. Processing chain 21 is established by parameters 22, which correspond in the schematic representation of FIG. 1 to strengths or probabilities of connections between various horizontal layers of processing chain 21, indicated here as an artificial neuronal network.

Result 24 of the classification, together with sensor data 11, is passed on to plausibility check module 3. Plausibility check module 3 obtains pieces of reference information 53 about object 52 via its wireless interface 31 from other vehicles 60, and/or from an infrastructure 70.

If plausibility check module 3 establishes a discrepancy between result 24 of the classification and pieces of reference information 53, plausibility check module 3 then actuates horn 54 in order to inform the driver of vehicle 50 that driver assistance system 49 is presently operating using contradictory information. Plausibility check module 3 then shifts KI-module 2, 2a, 2b into a learning mode and conveys sensor data 11 as learning values for input variable 23 as well as the "ground truth" in the form of pieces of reference information 53 as learning values for output variable 24 to KI-module 2, 2a, 2b. The inputs for the learning values are plotted to the left laterally on layers 23 and 24, in which input variable 23 and output variable 24 are present.

Alternatively, or also in combination, as plotted with dashed lines in FIG. 1, sensor data 11 and pieces of reference information 53 may be passed by plausibility check module 3 on to an external server 80. New parameters 22 for processing chain 21 of KI-module 2, 2a, 2b may be calculated on external server 80 from a plurality of such new learning data.

Figure 2:
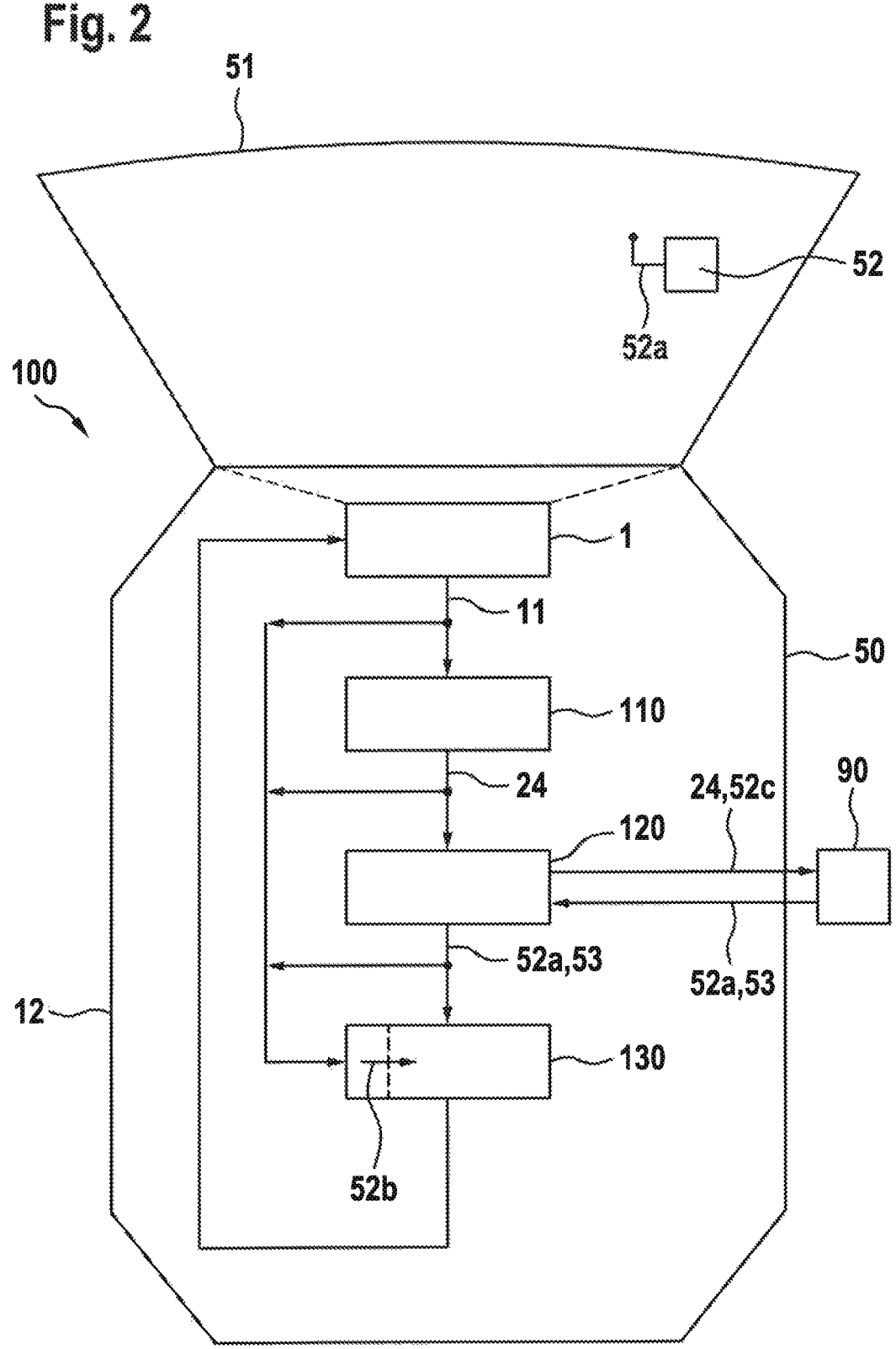
FIG. 2 shows an exemplary sequence of the method 100.

FIG. 2 shows by way of example, the sequence of method 100. Similar to FIG. 1, sensor data 11 of surroundings 51 of vehicle 50 are recorded by sensor 1 with the goal of recognizing object 52. In the example shown in FIG. 1, the sole plotted object 52 has a distinctive, visually recognizable feature 52a.

In step 110, sensor data 11 are classified in terms of the occurrence of objects 52. In step 120, specifically pieces of reference information 53 that relate to distinctive feature 52a of object 52, are retrieved from external database 90 based on type 52c of object 52, which is included in result 24 of the classification. These pieces of reference information 53 are compared in step 130 with characteristic 52b of feature 52a ascertained directly from sensor data 11. A manipulated variable 12 of sensor 1 is then optimized in such a way that characteristic 52b of feature 52a is correlated with pieces of reference information 53.

The correlation may be determined with an arbitrary quality level relevant to the respective application. For example, the quality level may reward it if feature 52a in sensor data 11, and/or in result 24 of the classification is recognized at the same spatial position at which it should be located according to pieces of reference information 53. If, for example, a spatial offset occurs, a swivel mechanism for sensor 1 (not plotted in FIG. 2) may then be activated using manipulated variable 12 to the effect that the offset is minimized. Alternatively, or in combination, the offset may also be algorithmically taken into consideration by transforming the output data supplied by sensor 1 mathematically in such a way that the offset is compensated for. Thus, manipulated variable 12 does not have to have a direct physical effect on sensor 1, but may rather have an effect on the downstream mathematical transformation. Alternatively or in combination, intrinsic and extrinsic sensor parameters may be adapted by manipulated variable 12 and thus be calibrated online in order to compensate for the offset.

However, the quality level may also reward, for example, the visibility of feature 52a and in the case of a low visibility, a lighting adjustment of sensor 1 may be activated using manipulated variable 12 with the goal of improving this visibility.

Figure 3:
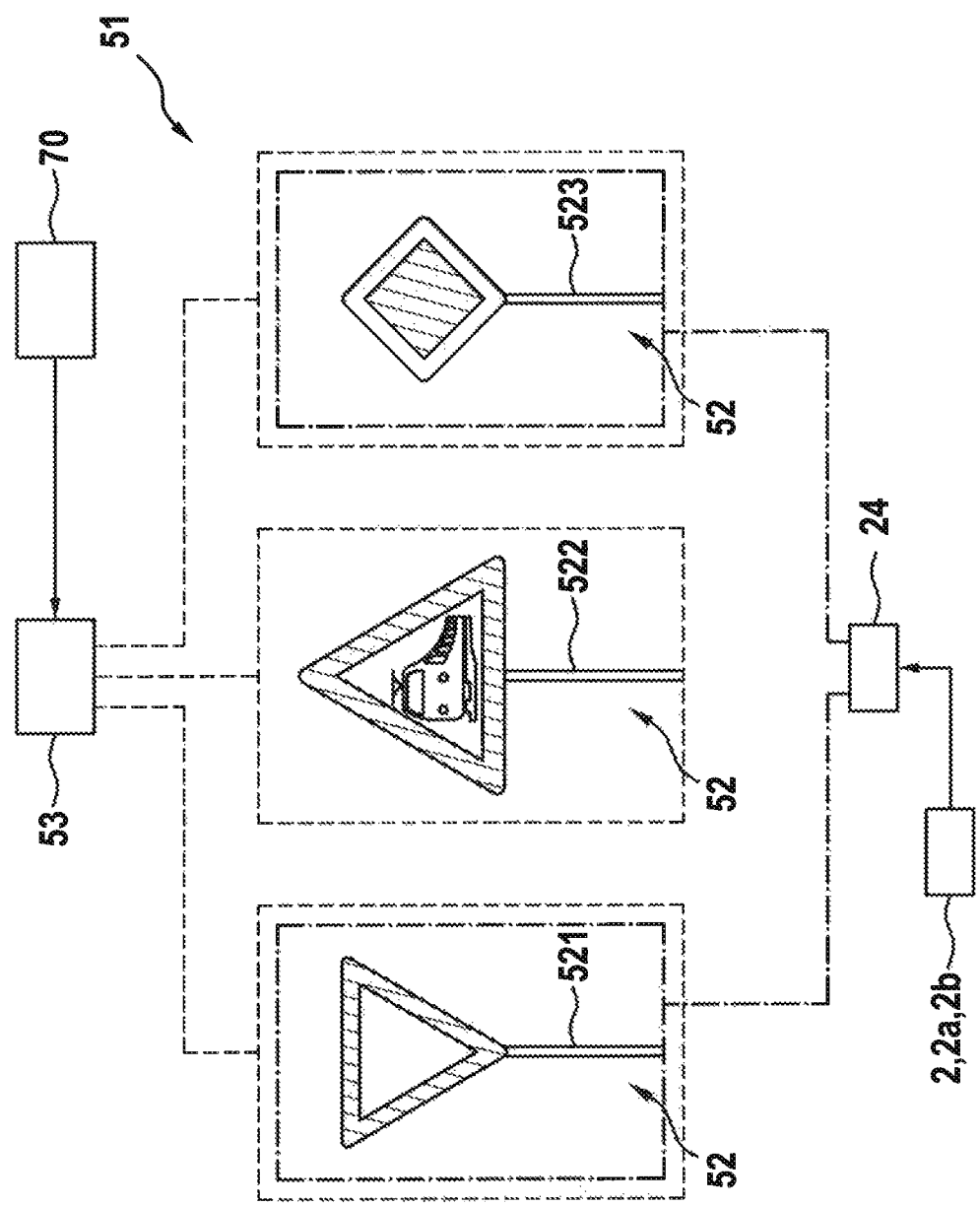
FIG. 3 shows an exemplary discrepancy between result 24 of the classification and pieces of reference information 53.

FIG. 3 illustrates a possible discrepancy between result 24 of the classification and pieces of reference information 53 as exemplified by traffic signs as objects 52.

In the example shown in FIG. 3, an infrastructure 70 may report via V2I communication pieces of reference information 53 that three objects 52 are present in surroundings 51 of vehicle 50 not plotted in FIG. 3, namely a traffic sign 521 "yield right of way," a traffic sign 522 "railroad crossing" and a traffic sign 523 "priority road." KI-module 2, 2a, 2b is not current and knows nothing of the last change of traffic sign 522 "railroad crossing," which previously showed a stylized steam locomotive. Subsequently, result 24 of the classification of objects 52 in surroundings 51 includes only traffic sign 521 "yield right of way" and traffic sign 523 "priority road," but not traffic sign 522 "railroad crossing." The discrepancy may be recognized with plausibility check module 3 not plotted in FIG. 3, and measures may be initiated so that in the future KI-module 2, 2a, 2b also recognizes traffic sign 522 "railroad crossing."

What is claimed is:

1. A plausibility check module for a driver assistance system for a vehicle, comprising:
a plausibility check device;
wherein:
the plausibility check device is configured to:
receive pieces of reference information supplied by other vehicles and/or by an infrastructure about objects in surroundings of the vehicle;
compare the pieces of reference information with a classification result produced by a KI-module;
in a case in which a deviation is established by the comparison, reduce the deviation by initiating at least one action that adapts parameters that establish an internal processing chain of the KI-module;
the at least one KI-module is configured to classify the objects in the surroundings of the vehicle based on sensor data supplied by at least one sensor, the classification being performed using the internal processing chain; and
the driver assistance system includes the at least one sensor for detecting the surroundings of the vehicle.

2. The plausibility check module of claim 1, wherein the action is at least to set the KI-module into a learning mode and to feed the KI-module the sensor data as a learning value for an input variable and the pieces of reference information as a learning value for an output variable.

3. The plausibility check module of claim 1, wherein the action is at least to report the sensor data and the pieces of reference information to an external server, which is configured to use this report as a piece of learning information for calculating updated parameters for the processing chain of the KI-module.

4. The plausibility check module of claim 1, wherein the plausibility check module is configured to actuate an acoustic warning device and/or a visual warning device of the vehicle, so as to make the driver of the vehicle aware of the deviation, when the deviation is established by the comparison.

5. A driver assistance system for a vehicle, comprising:
at least one sensor, wherein the at least one sensor is configured to detect surroundings of the vehicle;
at least one KI-module, wherein the at least one KI-module is configured to classify objects in the surroundings of the vehicle based on sensor data supplied by the at least one sensor, the classification being performed with an internal processing chain established by parameters; and
a plausibility check module;
wherein:
the plausibility check module is configured to:
receive pieces of reference information supplied by other vehicles and/or by an infrastructure about objects in the surroundings of the vehicle;
compare the pieces of reference information with a result of the classification produced by the KI-module; and
in a case in which a deviation is established by the comparison, reduce the deviation by initiating at least one action that adapts the parameters that establish the internal processing chain of the KI-module; and the at least one KI-module includes:
(1) a first KI-module, the parameters that establish the processing chain of the first KI-module being invariable; and
(2) a second KI-module, the parameters that establish the processing chain of the second KI-module being variable as a result of the action initiated by the plausibility check module.

6. The driver assistance system of claim 5, wherein the driver assistance system is configured to classify a union set of the objects classified by the two KI-modules as a set of objects present in the surroundings of the vehicle, in the case of a discrepancy the first KI-module having priority and/or a weighted combination of the confidence values ascertained by the two KI-modules being formed for the classification.

7. A driver assistance system for a vehicle, comprising:
at least one sensor, wherein the at least one sensor is configured to detect surroundings of the vehicle;
at least one KI-module, wherein the at least one KI-module is configured to classify objects in the surroundings of the vehicle based on sensor data supplied by the at least one sensor, the classification being performed with an internal processing chain established by parameters; and
a plausibility check module;
wherein:
the plausibility check module is configured to:
receive pieces of reference information supplied by other vehicles and/or by an infrastructure about objects in the surroundings of the vehicle;
compare the pieces of reference information with a result of the classification produced by the KI-module; and
in a case in which a deviation is established by the comparison, reduce the deviation by initiating at least one action that adapts the parameters that establish the internal processing chain of the KI-module; and
the KI-module is configured to classify the objects according to a k-nearest neighbor process.

* * * * *